(12) United States Patent
Moore et al.

(10) Patent No.: US 6,378,011 B1
(45) Date of Patent: Apr. 23, 2002

(54) PARALLEL TO SERIAL ASYNCHRONOUS HARDWARE ASSISTED DSP INTERFACE

(75) Inventors: David Moore, Riverton; Shayne Messerly, Farmington, both of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,744

(22) Filed: May 28, 1999

(51) Int. Cl.$^7$ .............................................. G06F 13/14
(52) U.S. Cl. ............................ 710/71; 710/70; 379/59; 379/98
(58) Field of Search ................................ 710/70, 71, 38, 710/22; 370/280; 379/59, 98; 455/454, 557

(56) References Cited

U.S. PATENT DOCUMENTS

| | | | |
|---|---|---|---|
| 5,134,644 A | * 7/1992 | Garton et al. | 340/539 |
| RE34,034 E | 8/1992 | O'Sullivan | 379/59 |
| 5,367,563 A | * 11/1994 | Sainton | 379/98 |
| 5,629,976 A | * 5/1997 | Loke et al. | 370/280 |
| 5,864,763 A | 1/1999 | Leung et al. | 455/557 |
| 5,873,039 A | 2/1999 | Najafi | 455/454 |
| 5,999,999 A | * 12/1999 | Homitsu et al. | 710/22 |
| 6,119,180 A | * 9/2000 | Terho et al. | 375/222 |
| 6,128,681 A | * 10/2000 | Shephard | 710/38 |

* cited by examiner

Primary Examiner—Thomas Lee
Assistant Examiner—Harold Kim
(74) Attorney, Agent, or Firm—Workman, Nydegger & Seeley

(57) ABSTRACT

Parallel data is serialized and transmitted and asynchronous data is received and placed into parallel bytes using a hardware assisted interface. The interface can be driven with very little overhead to the DSP. Additional timing registers and enhanced data buffers decrease the necessary DSP resource commitment. Furthermore the hardware settings in the interface can be adjusted by the DSP to optimize the interface's performance in transmitting various asynchronous protocols.

14 Claims, 4 Drawing Sheets

PARALLEL TO SERIAL ASYNCHRONOUS HARDWARE ASSISTED DSP INTERFACE

BACKGROUND OF THE INVENTION

1. The Field of the Invention

The present invention relates to the field of modem serial port communications, between a host computer modem and various mobile communication devices. More specifically the invention relates to a parallel to serial asynchronous hardware assisted DSP interface, as used in modem communication across digital or AMPS cellular networks, high speed digital telephone lines, and other wireless communication networks.

2. The Relevant Technology

The extensive development of powerful portable personal computers, low cost high speed modems, and digital cellular telephones, creates the infrastructure required for a convenient and efficient mobile data communication network. Unfortunately, one of the main obstacles to creating this type of mobile data communication network is the difficulty of integrating each of these components.

Mobile network designers continue to be burdened by communication standards established years ago for what was then three configurations. For example, modems of the kind used with portable personal computers are generally not intended to physically and electrically interface with digital cellular telephone networks, instead hardware interfaces and connectors focus on land based analog telephone networks. While some solutions to the compatibility and integration problems exist, each configuration contains defects that make the specific implementation either commercially prohibitive or impractical.

One configuration is to integrate the digital modem and digital cellular telephone into one unit, thereby creating a wireless modem with an integrated digital cellular transceiver. This configuration is undesirable for several reasons. First, the hardware necessary for digital cellular communication is expensive. Second, a user will generally need both a digital cellular modem and a digital cellular telephone. This configuration requires the user to carry expensive duplicate digital communication hardware around, not to mention the duplicate monthly digital phone service fee.

A second configuration uses a customized data interface on a digital cellular telephone that slows down the reception and transmittal of data to and from the personal computer. One problem with this configuration is that it does not take advantage of the high speed data transfer rates that are possible with a digital cellular phone. Instead, communication rates are limited to the traditional slower transfer rates associated with analog cellular phone lines. An additional problem with this configuration is that the customized data interface requires either special software, hardware, or both to operate effectively. This type of interface will often require a special digitally compatible modem to communicate with the digital cellular interface. This non-standard software and hardware requirement hampers the ability of the computer to run many common communication software programs that utilize a proprietary protocol or require standard serial connections but provide their own drivers. A useful example is the software necessary to connect with many Internet online services.

Another unacceptable configuration is to provide a hardware interface in a separate physical package from the modem. This interface simulates a standard RJ 11 telephone jack to the conventional modem and connects on the other side to the data input/output of a digital cellular telephone. The main disadvantage of this configuration is the need for additional hardware to be carried with the computer and added whenever a digital communications link is to be established. A secondary disadvantage is the drain placed on the battery of the laptop computer, the hardware interface, or the cellular telephone by the generation of high voltage signals required for the input to the modem, like the ring signal. Finally, the modem signal may be degraded through the hardware interface connections resulting in a potential loss of data before the information even gets onto the digital cellular network.

The invention of faster communication technology actually amplify these old throughput problem areas. The Universal Asynchronous Receiver Transmitter (UART) has long been accused of slowing down the serial communication data pipeline. Traditionally, cellular communication rates were limited by the serial nature of the analog cellular phone or the Advanced Mobile Phone Service (AMPS) cellular phone. Fortunately, the UART interface was barely sufficient to satisfy the transfer rate requirements of the modem. But increasing the speed of transmission and reception network only amplify the UART problems. With the advent of digital cellular telephones, transmission speeds exceed the capabilities of the standard UART. In fact the UART is being stressed on both sides as the V.90 protocol further enhances the modem's expected communication rate with the host computer.

Presently, there are two main improvements which are applying stress to the modem-to-digital phone network interface. First, the data communication rates of digital modems have increased substantially over previous levels. Second, the possible transmission rate across a digital cellular network is substantially higher than across the analog cellular network. Because the interface remains the same, it becomes the bottleneck between the DSP and the network. The result is that the digital modem DSP is able to quickly transfer data to the interface, but must either process each byte serially at substantial overhead or wait for the interface to complete serialization before the data can be transmitted across the cellular line. Often the overhead to the DSP can cause the user to notice system performance degradation while the DSP is stalling to send or receive the next byte.

Cellular modems must communicate with the cellular phone via a proprietary protocol established by the cellular manufacturer. In the case of the AMPS cellular standard, the communication is traditionally a low rate serial communication for control, and analog for data to be transmitted. These low rates are achieved by the DSP via a General Purpose Input Output (GPIO) port, but at a significant DSP overhead cost. Newer digital phones have higher rate communication interfaces that combine control and data, such that the DSP overhead at these rates would use too many DSP resources. What is needed in high speed digital cellular digital communication is an interface which allows the UART to function at a very high throughput level, while at the same time minimizing the drain upon the digital signal processor and personal computer. These particular features should be implemented utilizing hardware as software would increase the overhead pressure on the DSP.

Traditionally, the modem would send an interrupt signal to the DSP. The DSP would then pass on an interrupt to the personal computer telling the computer that data was waiting for it to pick up. Due to the slow transfer rate, the computer could easily handle the interrupt and return to performing its previous program function without any noticeable delay to the user. With the new high speed transfers of smaller data blocks, the DSP is continually waiting for the computer to send more data, creating more interrupts and therefore interfering with the overall performance of the personal computer. Often these asynchronous data transfers become too cumbersome, requiring the DSP to virtually stop work on other projects until the data is processed. In essence the DSP is churning over the data blocks. This processor overhead drain is amplified when the device is connected to a cellular phone as the delays in verifying the quality of the data may cause the user of the personal computer, to notice a slowing in performing standard functions.

The dramatic increase in transmission capability has created a unique problem for modems trying to communicate across digital cellular networks. What is needed is an interface that can increase the throughput to an AMPS cellular or digital phone without increasing the overhead to the DSP. An improved hardware interface would enhance the ability of the modem to transfer larger data blocks based on the particular protocol being employed without requiring replacement of interface hardware components.

What is needed is a simple hardware solution integrated into the modem which allows for connectivity between the digital cellular telephone and the portable personal computer at a low cost and yet still reliable system. This hardware should support the widely available communication software conformed to the accepted IEEE standards, and alternatively permit data communication across a conventional telephone network.

SUMMARY AND OBJECTS OF THE INVENTION

It is an object of the present invention to provide a hardware driven AMPS cellular or digital phone interface that can be driven with very little overhead to the DSP.

Another object of the present invention is to improve the synchronous parallel to asynchronous serial throughput rate and overall DSP Input/Output efficiency through the implementation of specialized buffering registers that allow the interface to optimize the buffer threshold and fill levels based upon the protocol specifications provided to the interface by the DSP.

A further object of the present invention is to provide added ability to the DSP to communicate with the computer via a standard serial port as a debugging tool or as a method to achieve accurate performance analysis.

The invention describes a parallel to serial asynchronous hardware assisted DSP interface or serial data module. One advantage of the invention is that the interface can be driven with very little overhead to the DSP. Furthermore, the hardware settings in the interface can be adjusted by the DSP for optimal performance using various asynchronous protocols. Optimization occurs through a calculation made by the DSP to determine the most efficient FIFO size for a particular protocol. A useable space FIFO is developed from the real FIFO by establishing a threshold point using the registers to indicate the best fill level for the interface. This flexibility makes the invention valuable as a serial asynchronous debugging tool. The various configurations are also useful in obtaining an accurate performance analysis of a computer's serial data transfer efficiency.

The serial data module contains three main sub-modules designed to assist the DSP with serial data operations. The first module is a register module or asynchronous serial data (ASD) module. The second module is a hardware timer, utilized to assist with complicated timing issues as well as coordinating stale counts and data sampling. Finally, an EEPROM control module provides a hardware implementation of the DSP code used to program the EEPROM so that the DSP does not have to run the protocol and dramatically reducing the DSP overhead associated with changing protocols. The EEPROM controller can be erased and rewritten by either the DSP or the ASD. Another element is the bus controller with an independent ASD Tx control module and an ASD Rx control module. The data bus controller connects with a parallel DSP interface that allows the DSP to write data in a parallel fashion and have the hardware shift the data out in a serial fashion. The DSP interface including the IRQ signals, the external clock signal, the address bus, the read and write data buses, the reset control signal, the module selection and address buses, and the strobe and write signals. The ASD module will receive serial data in and transform the data so that the DSP can read parallel data. By performing the data serialization the DSP is relieved of the intensive tasks associated with the serializing of the data and creating the desired serial interface. The hardware timer can be used to assist with any timing critical operations, but is inserted primarily to help the DSP time very slow serial data communications whenever the ASD module does not perform the appropriate protocol.

The DSP communicates with the ASD module through registers found in the serial data module. Data is written to the Tx FIFO through the DSP to ASD FIFO register (DAF). Data is read from the Rx FIFO from ASD to DSP FIFO register (ADF). The ASD is reset and enabled utilizing a third register called the control register. The control register acts like a control register for the serial data module, by allowing the DSP to make changes through a write to the register. The status of interrupts and other functions can be read by the DSP through a separate fourth register, called the status register or Serial Data Status Register (SDSR). FIFO thresholds for interrupts are contained in two registers called the ASD Rx FIFO Threshold Register (ARFTR) and the ASD TX FIFO Threshold Register (ATFTR). The Rx stale count is also written to yet another register called the Rx Stale Count Register (RSCR).

The serial data module is able to communicate with the outside world through two asynchronous serial data interface pins. The two pins that provide the serial data interface are the Asynchronous Serial Data Out (ASDO) pin and the Asynchronous Serial Data In (ASDI). This interface is totally asynchronous and data transfer is enabled when the appropriate bits in the Control Register are set and the data is sent through the serialization process. The serial data module also generates the start bit for Tx data and waits for the start bit on the ASDI pin.

To receive data the ASDI pin is polled at the system clock rate. This oversampling of the ASDI pin at the system clock rate increases the accuracy of the system. After each system clock cycle a bit sample is evaluated as being high or low. A counter averages the bit samples received by adding one if the bit sample was high and subtracting one if the bit sample was low. At the end of the bit period designated by the BRGR, the bit is assigned a one if the counter is positive, or a zero if it is zero or negative. Oversampling the incoming bits increases the accuracy of incoming data when compared to data collected using a single bit sample method. While a single bit sample could produce accurate data, the process subjects the data to a greater risk of degradation. When a start bit is detected on the ASDI pin and the transfer enable bit is enabled in the control register, the receive data state machine is initialized and the ASDI pin is oversampled at the system clock rate until a byte is received. When the byte is received it is subsequently loaded into the Rx FIFO as shown in FIGS. 2 & 3.

To send data the transfer begins with a generation of a start bit immediately upon the availability of the data in the Tx FIFO and the corresponding setting of the transmit enable bit in the control register. The byte is then shifted out serially with the least significant bit (LSB) first. When the last bit (the MSB) is shifted out a stop bit is then generated signifying the end of a byte frame. The timing diagram and state machine controlling this process is demonstrated in FIGS. 4 & 5.

The serial data module removes substantial overhead from the DSP by receiving parallel data reads and converting that data into asynchronous data frames to be sent out over the serial communication lines. The serial data module further optimizes communication between the DSP and the module by establishing flexible threshold values which allow the module to be optimized for a particular protocol and to take advantage of the high speed digital cellular networks. This flexibility is allows for the adaptation of the serial data module to various wireless communication protocols including AMPS cellular and digital cellular.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Cellular telephones must communicate with the cellular modems via a proprietary protocol established by the cellular manufacturer. In the case of AMPS cellular, the communication is usually low rate serial communication. These low rates could be achieved by the DSP through a general Purpose Input Output (GPIO) port, but at significant DSP overhead. Newer digital phones have higher speed transmission interfaces, such that the DSP overhead at these rates would use too many DSP resources. The preferred embodiment of the "Parallel to Serial Asynchronous Hardware Assisted DSP Interface" relieves the DSP of many of the previously required processing resources.

There are two main hardware features of this interface configuration that allow for this overhead reduction. First, the interface design serves as an asynchronous serial to parallel and parallel to serial interface. Second, the design provides critical timing information to the DSP to help calculate an optimal transmission pace for the serial data sent from a communications port, such as a GPIO port.

Figure 1:
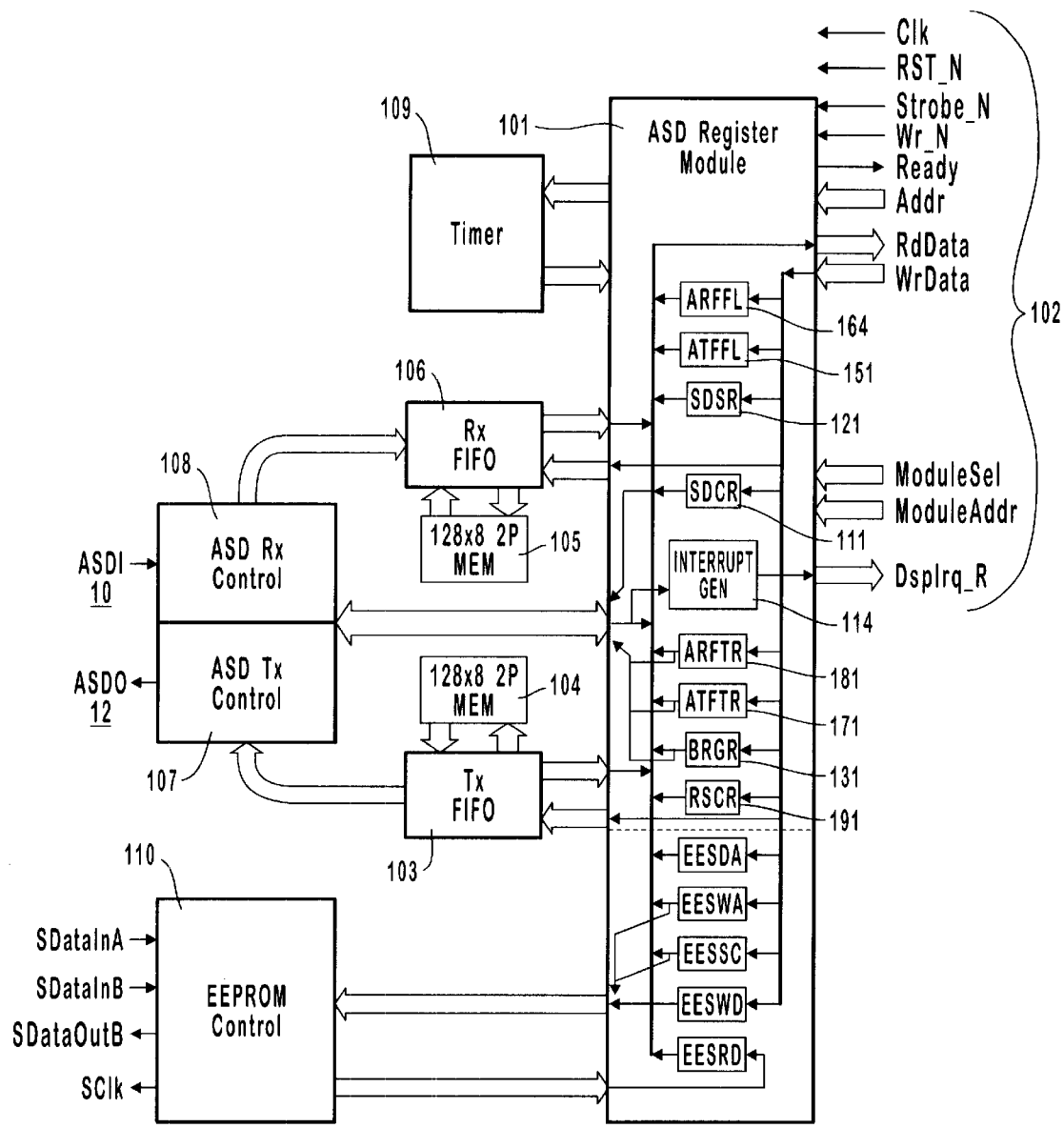
FIG. 1 is a block diagram of the parallel to serial asynchronous hardware assisted serial data module.
Figure 4:
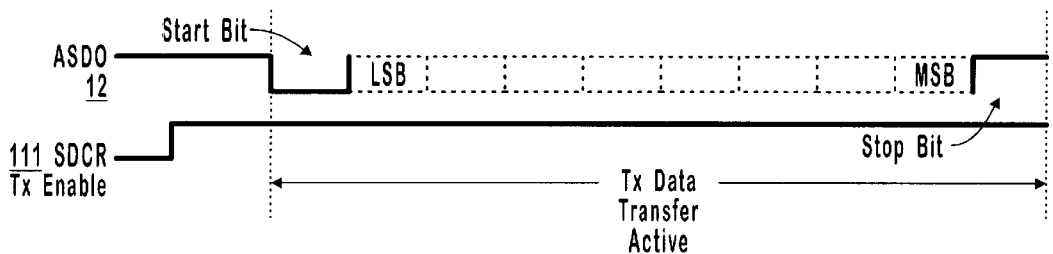
FIG. 4 is a Tx Transfer Timing Diagram depicting the ASDO pin and Transmit Enable bit for an asynchronous data frame.
Figure 5:
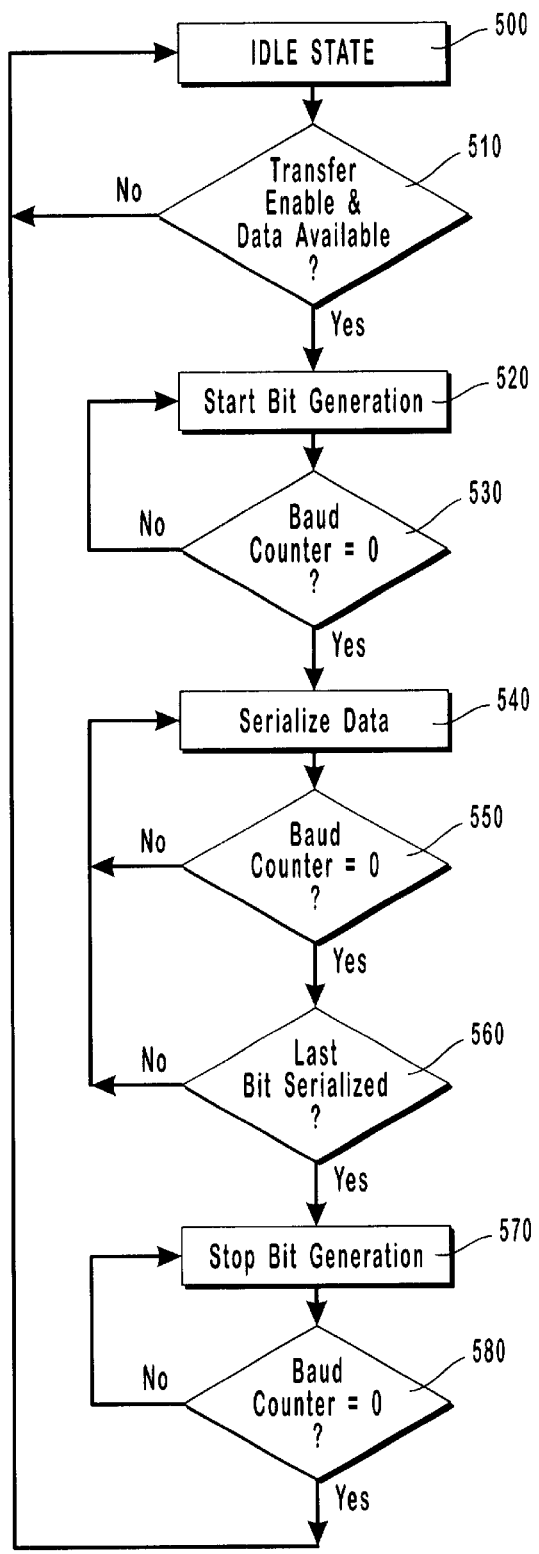
FIG. 5 is a Tx State Diagram depicting the Serial Data Module Transmission State machine for creating and sending asynchronous Data.

As depicted in FIG. 1, the asynchronous serial to parallel and parallel to serial conversion is accomplished in the following manner: First, data is sent by setting the Tx Transfer Enable bit in the control register, illustrated as the Serial Data Control Register (SDCR) 111 in FIG. 1. Setting the bit will initialize the Tx State Machine as depicted in FIG. 5, if the DSP Interface 102 indicates that there is data available to be transmitted. Following a single parallel write from the DSP to the ASD Register Module 101 across the DSP Interface Bus 102, the ASD Register Module 101 increments the ASD Tx FIFO Fill Level Register (ATFFL) 151 and places the parallel data into a Tx FIFO Register 103. The Tx FIFO Register 103 immediately writes the byte to the 128×8 Tx FIFO 104. The ASD Tx Control 107 then performs an asynchronous serial transfer at an established rate based on the baud rate generator register 131. For complex timing issues the values stored in the Hardware Timer Count Register Low (HTCRL) 112 and the Hardware Timer Count Register High (HTCRH) 113 of the hardware timer module 109 may be used to assist in the timing of the transfer. Following the start bit, each subsequent bit is sent out on the ASDO 12 according to the baud rate generator register (BRGR) 131, until the stop bit can be generated as illustrated in FIGS. 4 and 5.

Many asynchronous protocols are more efficiently supported by the serial data module through a EEPROM programmed for the protocol. Unfortunately, most EEPROM implementation require tremendous overhead by the DSP to initialize the system. The EEPROM Control Module 110 contains the hardware implementation of the DSP code used to program the EEPROM. The overhead for the DSP is dramatically reduced, because the DSP does not have to run the protocol and the programming can be directed by the EEPROM Control Module 110. The EEPROM Control Module 110 can be erased and rewritten by the DSP or by the ASD Register Module 101. The standard registers associated with the EEPROM control module include the EEPROM Serial Device Address (EESDA) register containing a seven bit value representing the device address of the EEPROM, the EEPROM Serial Word Address (EESWA) for accessing the EEPROM, the EEPROM Serial Read Data (EESRD) register holding the 8 bit read value from the EEPROM, the EEPROM Serial Write Data (EESWD) register holding the 8 bit write value to the EEPROM, and the EEPROM Serial Status/Control (EESSC) register which contains the serial clock period signal, the EEPROM read write enable signal, the cycle complete signal, the access fail signal, along with several GPIO control signals.

Figure 2:
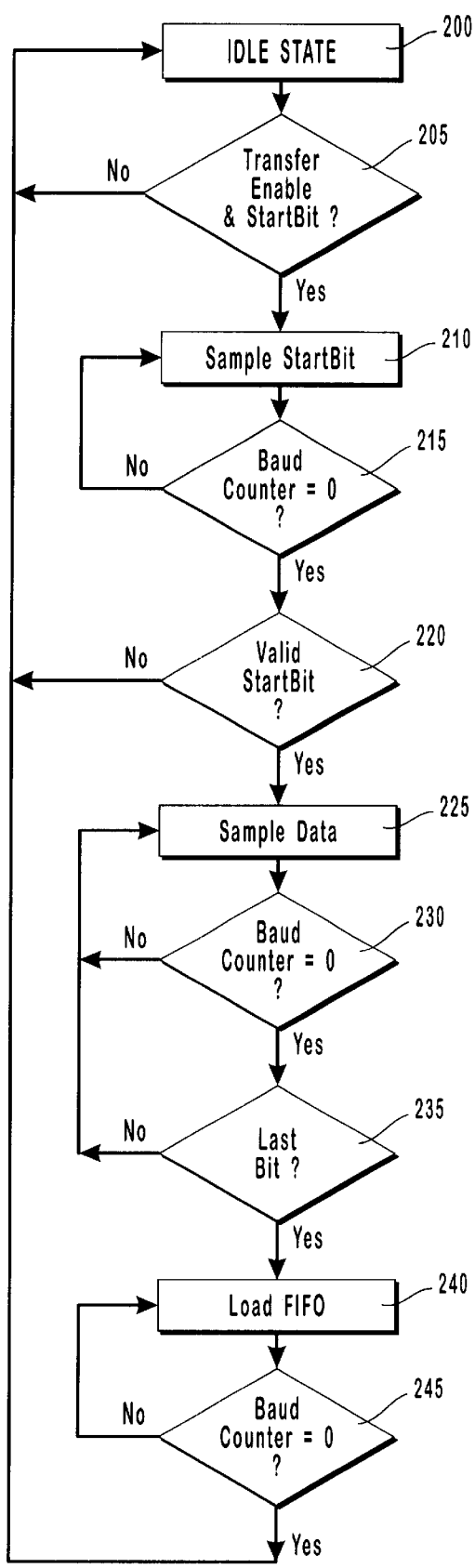
FIG. 2 is a Rx State Diagram depicting the state machine implemented by the Serial Data Module for receiving and disassembling asynchronous data.
Figure 3:
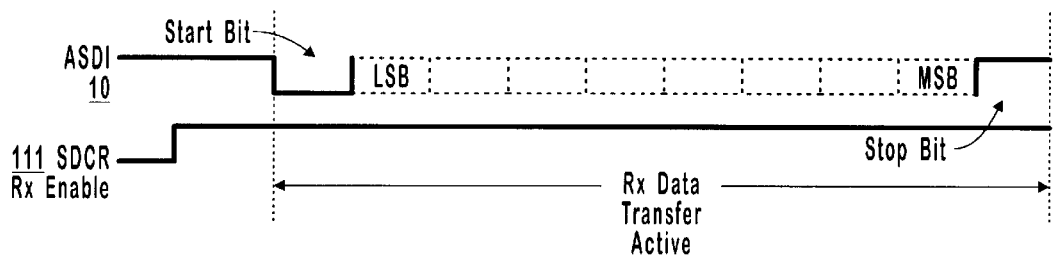
FIG. 3 is a Rx Transfer Timing Diagram depicting the ASDI pin and Receive Enable bit for an asynchronous data frame.

To receive data the ASDI pin 10 is polled at the system clock rate until a start bit is detected and the Rx Transfer Enable bit in the SDCR 111 is set. The data is then received as illustrated in FIGS. 2 and 3 according to the timing control of the ASD Rx Control 108 and the BRGR 131. A stale count interrupt is asserted by the Interrupt Generator 114 when there is one or more characters in the Rx FIFO and the DSP has not read anything from the Rx FIFO within a given time period. The stale count IRQ issues once the number of BRGR 131 counts exceeds the sixteen bit value stored in the Rx Stale Count Register (RSCR) 191. The ASDI pin 10 is oversampled for each bit at the system clock rate until the BRGR ends the bit cycle, the oversampling continues until the byte is received. The byte is subsequently loaded into the Rx FIFO Register 106, and copied to the 128×8 FIFO buffer 105 until the DSP can retrieve the data in a parallel fashion. The ASD Rx FIFO Fill Level register (ARFFL) 161 is then incremented. The buffering allows the DSP to read from and write to the interface in parallel and with lower overhead. This frees the DSP to perform other tasks between data transfers.

This new invention can also provide the DSP with critical timing information necessary when communicating with devices that don't use standard asynchronous serial communications method by interrupting the DSP at specific rates. The Interface Register Module contains several registers which can help with this customization. For example, both Rx and Tx data paths provide a threshold register, illustrated in FIG. 1 as the ASD Tx FIFO Threshold Register (ATFTR) 171 and the ASD Rx FIFO Threshold Register (ARFTR) 181. These registers contains a value representing the point where the DSP should begin to fill the Tx FIFO 103 or empty characters from the Rx FIFO 106. Proper utilization of these registers allows the DSP to specialize the number of bytes sent together and to optimize the size based on the selected protocol.

Another useful register combination are the ATFFL 151 and ARFFL 161 registers. Using these registers, the DSP can determine the number of reads or writes necessary to empty or fill the FIFO. This means the DSP can avoid polling the FIFO full button each time it attempts to transmit values. A further advantage of the preferred embodiment is that some of the interrupts can be controlled by the SDCR 111.

Finally, using both the Serial Data Status Register (SDSR) 121 and the hardware timer 109 allows the DSP to pace communication through other existing ports. This is a very unique feature as the parallel DSP transfers are delayed to comply with serializing timing expectations. The true effect of pacing is that the Serial Data Module becomes not only an excellent diagnostic tool, but compatible with an large variety of asynchronous protocols.

FIG. 2 is a Rx State Diagram depicting the state machine implemented by the Serial Data Module for receiving and disassembling asynchronous data. The Rx state machine initializes to an Rx Idle State 200. In this Rx Idle State 200, the state machine performs the conditional query to check if the Transfer Enable bit is set and a Start Bit is detected 205. If both conditions are met the state machine moves to the Sample Start Bit state 210. The Sample Start Bit state remains in this state until the Baud Counter is zero and the Baud Counter conditional query 215 is satisfied. The state machine subsequently performs the Valid Start Bit query 220 to determine if the start bit is still being received. If not the machine returns to the Rx Idle State 200, otherwise the machine moves to the Sample Data state 225. From the Sample Data state 225 the machine oversamples the signal at the system clock cycle rate to find an average value for the bit until the Baud Counter Query 230 is satisfied. Once the query is satisfied the average value is shifted in as one of the received bits. If the shift is followed by a negative Last Bit query 235, the machine begins oversampling the next bit. If the Last Bit query 235 is positive the Rx State Machine has received the last bit and moves to the Load FIFO state 240. Load FIFO 240 loads the collected data byte into the Rx FIFO through a parallel write after one clock cycle indicated by the Baud Counter query 245. After Baud Counter 245 is reset to zero, the state machine returns to the Rx Idle State 200.

FIG. 3 is a Rx Transfer Timing Diagram depicting the ASDI pin 10 and Receive Enable bit for an asynchronous data frame. This diagram closely corresponds to FIG. 2 and demonstrates how the Rx Enable bit of the SDCR 111 affects the data sampling of the ASDI pin 10. Sampling occurs in mid clock cycle in an effort to allow the signal to settle down.

FIG. 4 is a Tx Transfer Timing Diagram depicting the ASDO pin 12 and Transmit Enable bit for an asynchronous data frame. The Tx Enable bit of the SDCR 111 and the Start bit allow the Tx Data Transfer to become active. No sampling is necessary as the data is simply shifted out along the ASDO pin 12 according to the state diagram in FIG. 5.

FIG. 5 is a Tx State Diagram depicting the Serial Data Module Transmission State machine for creating and sending asynchronous Data. The Tx state machine initializes to an Tx Idle State 500. In this Tx Idle State 500, the state machine performs the conditional query to check if the Transfer Enable bit is set and Data Available is set 510. If both conditions are met the state machine moves to the Start Bit Generation state 520. The Start Bit Generation state 520 creates the signal to signify the start of the data frame. The state machine remains in the Start Bit Generation state 520 until the Baud Counter is zero, thereby satisfying the Baud Counter query 530 to move the state machine into the Serialize Data state 540. In this state, the original parallel data is serialized by shifting one bit out on the ASDO pin 12, LSB first, until the Baud Counter Query 550 is satisfied. Following a negative Last Bit query 560, the machine returns to the Serialize Data state 540 and shifts the next bit out. If the Last Bit query 235 indicates that the data byte has been sent, the Tx State Machine has sent the last bit and moves to the Stop Bit Generation state 570. Once the data frame is closed with the Stop Bit generated in this state and one clock cycle passes, as indicated by the Baud Counter query 580, the state machine returns to the Idle State 500.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A serial data apparatus for converting parallel data generated by a digital signal processor (DSP) into asynchronous serial data bytes according to an asynchronous protocol specified by the DSP and in a separate pipeline converting asynchronous serial data to synchronous parallel data, the apparatus comprising:
   a register module;
   a receive data FIFO digitally connected to the register module;
   a transmit data FIFO digitally connected to the register module;
   a DSP interface digitally connected to the register module comprising a bidirectional control signal bus, a bidirectional DSP data bus, and a read only status bus;
   a timing control interface digitally connected to the register module, the receive data FIFO, and the transmit FIFO;
   a asynchronous serial data out (ASDO) pin digitally connected to the timing control interface; and
   a asynchronous serial data in (ASDI) pin digitally connected to the timing control interface.

2. The apparatus as in claim 1, wherein the register module includes a status register which contains transmission and reception status flags represented as individual bits in the register thereby providing the DSP with status information with one read.

3. The apparatus as in claim 2, wherein the register module further comprises a control register giving the DSP control to initialize the transmit data FIFO and the receive data FIFO, as well as enabling all data transmissions to the apparatus and data receptions from the apparatus.

4. The apparatus as in claim 3, wherein the apparatus provides the DSP with critical timing information necessary for the DSP to pace serial data being sent, thereby allowing the DSP to communicate with devices that do not use standard asynchronous serial communication methods.

5. The apparatus as recited in claim 4, wherein the timing control interface performs pacing and serialization through control of the receive data FIFO and transmit data FIFO without direct DSP intervention.

6. The apparatus in claim 5, wherein the apparatus further comprises an EEPROM control module that eliminates the need for the DSP to run the communication protocols necessary to program the EEPROM, said EEPROM control module being readable and writable by the register module or DSP.

7. The apparatus as in claim 6, wherein the receive data FIFO and the transmit data FIFO are 128×8 two port FIFO memory modules.

8. An electronically integrated high throughput asynchronous serial data input/output interface comprising:
   a register module comprising an interrupt generator, a serial data control register, a serial data status register, a baud rate generator register, a receive stale count register, a transmission fill level register, a receive fill level register, a transmission FIFO threshold register, and a receive FIFO threshold register;
   a transmit FIFO buffer electronically connected to said register module, the transmit FIFO buffer being selectively adjusted in defined useable size for efficient asynchronous data transfers between a processor and a serial transmission line;
   a receive FIFO buffer electronically connected to said register module, the receive FIFO buffer being selectively adjusted in defined useable size for efficient asynchronous data transfers between a serial transmission line and a processor;
   an asynchronous transmit control module electronically connected to said transmit FIFO buffer and said register module;
   an asynchronous receive control module electronically connected to said receive FIFO buffer and said register module.

9. The interface as in claim 8, wherein said processor is a digital signal processor (DSP) and the transmit FIFO threshold register and receive FIFO threshold register contain values for selectively adjusting the defined useable size for efficient communication between the DSP and the serial transmission lines, such that the adjustment involves minimizing overhead of the DSP specifically associated with a selected asynchronous protocol.

10. The interface as in claim 8, wherein the serial data status register provides single clock cycle access for communication related bit flags from the interface comprising:
    a transmit FIFO empty flag set when the transmit FIFO is empty;
    a transmit FIFO threshold flag that is set when the number of characters in the transmit FIFO is less than or equal to a transmission threshold value, thereby signally the preselected level that the processor should begin to refill the transmit FIFO;
    a transmit FIFO full flag that is set when the transmit FIFO is full, depending on the asynchronous protocol being used, this will either create a buffer overflow interrupt or it will send an interrupt to the processor to stop sending data to the FIFO until there is room as well as sending an enable transmission signal to the asynchronous transmit control module until the transmit threshold flag is set;
    a receive FIFO empty flag set when the receive FIFO is empty;
    a receive FIFO threshold flag that is set when the number of characters in the receive FIFO is greater than the receive threshold value, thereby signally the preselected level that the processor should begin to empty the receive FIFO;
    a receive FIFO Full flag that is set when the receive FIFO is full, depending on the asynchronous protocol being used, this will either create a buffer overflow error or send an interrupt to the processor to empty the FIFO along with a disable receive signal to the asynchronous receive control module until the receive FIFO threshold flag is cleared; and
    a receive character time out flag, set when no characters have been removed from the Receive FIFO for a time period equal to the bit transfer rate times the value store in the stale count register and there is one or more characters in the FIFO.

11. The interface as in claim 8, where in the interface further comprises a hardware timer electronically connected to said register module, said hardware timer assisting the interface with timing critical operations and may be used by the DSP to time slow serial data communications when the proper asynchronous protocol has not been performed, thereby allowing the interface to continue its effectiveness by minimizing overhead of the DSP even with non-standard asynchronous protocols.

12. The interface as in claim 8, wherein the serial data control register provides the DSP with selective FIFO reset control, as well as the ability to selectively enable transmission, reception, and hardware timing with one write operation.

13. The interface as in claim 8, said interface further comprising a EEPROM Control module containing a hardware implementation of the DSP code needed to program the EEPROM with communication protocols.

14. In a computer system including a modem with a parallel to serial asynchronous hardware assisted DSP interface, a method of communication that converts asynchronous digital cellular data into parallel synchronous data for the DSP and converts parallel synchronous data from the DSP into asynchronous serial data frames for transmission across a digital cellular communication line, the communication method comprising the steps of:

receiving asynchronous data into the interface and transmitting the data to the DSP in a parallel synchronous fashion;

receiving synchronous parallel data and sending the data in accordance with an established asynchronous transfer rate and method;

said receiving asynchronous data into the interface and said transmitting data to the DSP step including the steps of:

receiving the asynchronous data from the digital cellular phone;

storing the data in a parallel fashion in a buffer until an appropriate threshold value is reached;

sending a threshold interrupt to the DSP;

reading parallel data a threshold number of times from the buffer;

said receiving synchronous data and said sending asynchronous data including the steps of:

writing a single parallel data byte to the interface;

placing the data in an interface buffer;

sending the data in accordance with an establish asynchronous protocol at an established transfer rate.

* * * * *